Feb. 23, 1926.
D. E. SNYDER
1,574,177
ANTISKID DEVICE FOR VEHICLE WHEELS
Filed June 4, 1925
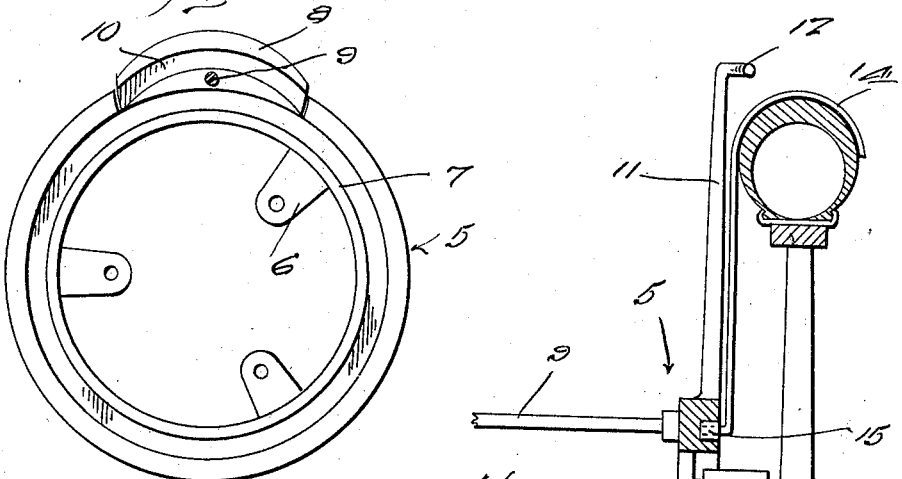
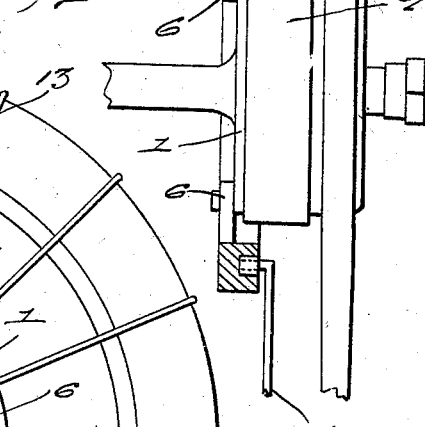
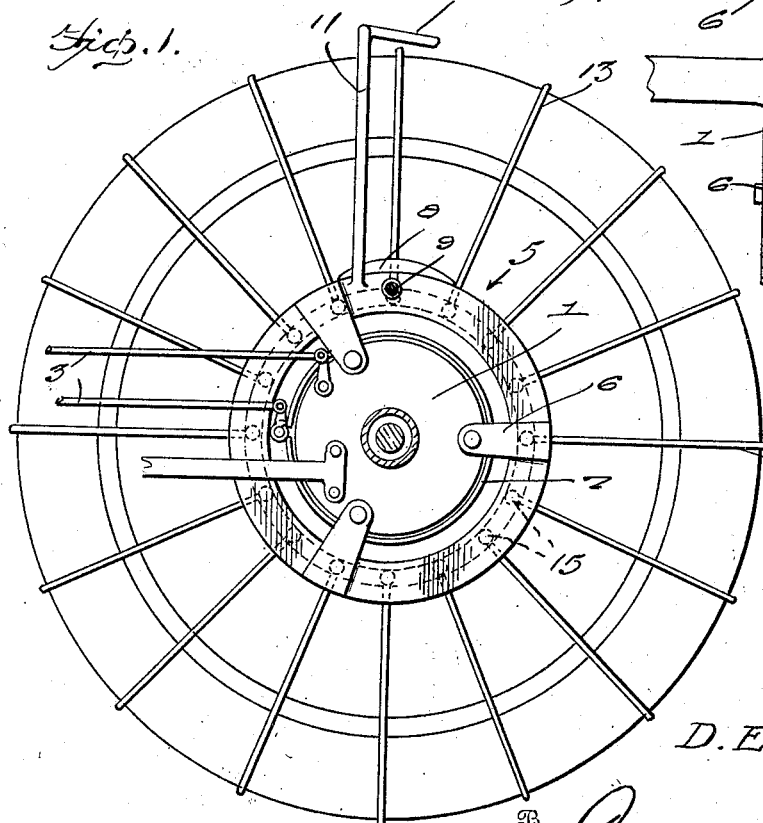
Inventor
D. E. Snyder
By Clarence A. O'Brien
Attorney Patented Feb. 23, 1926.

1,574,177

UNITED STATES PATENT OFFICE.

DANIEL E. SNYDER, OF ROSELAND, NEBRASKA.

ANTISKID DEVICE FOR VEHICLE WHEELS.

Application filed June 4, 1925. Serial No. 34,873.

*To all whom it may concern:*

Be it known that I, DANIEL E. SNYDER, a citizen of the United States, residing at Roseland, in the county of Adams and State of Nebraska, have invented certain new and useful Improvements in Antiskid Devices for Vehicle Wheels, of which the following is a specification.

This invention relates to an improved anti-skid device, which is adapted more particularly for use upon automobile wheels.

The principal object is to provide a structure embodying a plurality of individual traction members permanently mounted upon the axle in a manner to permit them to be racked in side by side relation to dispose them in an out-of-the-way position when not in use.

Briefly, the invention comprises a permanently mounted annulus having a guide way in which roller bearings on the inner ends of the traction members are received, means being provided and extending into said guide way, so that upon proper manipulation the bearings may be caused to ride out of the guideway to hang the hooked ends of the traction members upon a stationary rack.

Advantages derived from this arrangement will become apparent from the following description and drawings.

In the accompanying drawing, forming a part of this application, and in which like numerals are employed to designate like parts throughout the same:

Figure 1 is a side view of an automobile wheel showing the braking means, together with the improved traction device mounted thereon.

Figure 2 is an enlarged detail section showing a portion of the device.

Figure 3 is a side elevation of the aforesaid annulus.

In the drawings, the reference character 1 designates an end flange on an axle housing, and 2 designates the brake band operated by the usual operating rods 3. The tire is represented by the reference character 4. The spokes have been omitted, for clearness.

Surrounding the flange 1 is an annulus 5. As before stated, this annulus is rigidly fastened to the flange 1 and this is accomplished by providing the annulus with attaching ears 6, which are bolted or otherwise fixedly mounted in place. The annulus is formed in one side with a channel 7, constituting a guide or trackway. At the top, a portion of the periphery is cut out, and an arcuate block 8 is pivoted between its ends in this cut-out portion. The block is preferably mounted upon a rod 9 which is carried to a convenient point within reach of the driver to permit it to be rocked to throw the block upon an angle and to dispose it in alignment with the guideway 7. This block is formed with an arcuate groove 10, which is adapted to align with the trackway. Formed integral with the annulus and extending upwardly therefrom adjacent the block is a bracket arm 11 having an inclined angularly directed free end portion 12. This bracket actually functions as a rack, as will be more clearly apparent as the description goes on.

The traction members are indicated by the reference characters 13. These are in the form of individual wires bent at their outer ends to provide portions 14, fitting over the tread of the tire. The opposite inner ends are directed angularly and provided with antifriction roller bearings 15, of a size to be snugly received in the trackway 7.

Assuming that the traction wires are distributed about the tire in the approximate relation shown in Figure 1, and that it is desired to move them in inoperative positions, the rock shaft 9 is rotated, in a direction to tip the grooved block 8, upon an angle, so that the groove 10 therein is in alignment with the trackway 7. Ordinarily, the block is in the horizontal disaligned position shown in Figure 3 and does not interfere with circular travel of the roller bearings in the track. However, as soon as the block is run crosswise of the track, it is obvious that the roller bearings, instead of following the course around the track will ride into the groove, will stack against each other, and the hooked ends thereof will be racked upon the finger 12 of the bracket 11. The bracket is of a size to permit all of the traction wires to be racked thereon. A consideration, in connection with the drawings, will enable persons skilled in the art to which the invention relates to obtain a clear understanding of the same. Therefore, a more lengthy description is thought unnecessary.

While I have shown the preferred embodiment of the invention it is to be understood that various changes in the size, shape and arrangement of parts may be resorted to, without departing from the spirit of the invention or the scope of the appended claims.

Having thus described by invention, what I claim as new is:

1. In an anti-skid device, in combination, an axle, an annulus fixedly mounted upon the end portion of the axle, said annulus being provided with a groove forming a trackway, and a plurality of anti-slipping members provided on inner ends with anti-friction roller bearings movable in said trackway, the outer ends of said members being provided with portions extending over the tread of the tire to afford traction.

2. In an anti-skid device, in combination, an axle housing, an annulus fixedly mounted upon the flanged portion of the housing, said annulus being provided with a groove forming a trackway, and a plurality of anti-slipping members provided on inner ends with anti-friction roller bearings movable in said trackway, the outer ends of said members being provided with portions extending over the tread of the tire to afford traction, and means carried by said annulus, whereby said traction members may be racked thereon to dispose them out of the way when not in use.

3. A structure of the class described comprising an annulus formed in one side with a groove providing a trackway, a block rockably mounted upon said annulus and provided with an arcuate groove adapted to be disposed in alignment with said trackway, and an arm rigidly connected with said annulus and having it free end erected angularly to provide a rack finger.

4. A structure of the class described comprising an annulus formed in one side with a groove providing a trackway, a block rockably mounted upon said annulus and provided with an arcuate groove adapted to be disposed in alignment with said trackway, an arm rigidly connected with said annulus and having its free end erected angularly to provide a rack finger, and a plurality of individual traction members having hooks formed at their outer ends adapted to cooperate with the tread of a tire, and having their inner ends directed angularly, and roller bearings carried by said last named ends and fitted in said trackway.

In testimony whereof I affix my signature.

DANIEL E. SNYDER.